United States Patent
Drelich

[15] 3,661,735
[45] May 9, 1972

[54] SHAPED ARTICLES HAVING IMPROVED SURFACE PROPERTIES AND CORONA DISCHARGE METHODS AND APPARATUS FOR MAKING THE SAME

[72] Inventor: Arthur H. Drelich, Plainfield, N.J.
[73] Assignee: Johnson & Johnson
[22] Filed: Oct. 14, 1969
[21] Appl. No.: 866,220

[52] U.S. Cl. ............................................204/165, 204/323
[51] Int. Cl. .........................................B01k 1/00, B01j 1/00
[58] Field of Search....................................204/165

[56] References Cited

UNITED STATES PATENTS

| 3,057,792 | 10/1962 | Frohlich | 204/168 X |
| 3,255,099 | 6/1966 | Wolinski | 204/168 X |
| 3,391,044 | 7/1968 | Kaghan et al. | 204/168 X |
| 3,391,070 | 7/1968 | Morgan | 204/168 |
| 3,462,335 | 8/1969 | Hansen et al. | 204/168 X |
| 3,526,583 | 9/1970 | Hayward | 204/168 X |

Primary Examiner—F. C. Edmundson
Attorney—Alexander T. Kardos and Robert L. Minier

[57] ABSTRACT

Films, sheets, expanded or foamed products, fibrous webs, and similar synthetic, organic, polymeric shaped articles and structures having surfaces with improved bonding and adhesion capabilities, increased fluid absorbency rates, and enhanced fluid wicking properties; and processes and apparatus for obtaining such improved capabilities and enhanced surface properties and characteristics by exposing said shaped articles to the action of an electrical corona discharge in an atmosphere of a reactive gas which does not have an affinity for electrons and which is also capable of acting as a chemical reducing agent, such as carbon monoxide, for example.

6 Claims, 4 Drawing Figures

PATENTED MAY 9 1972 3,661,735

INVENTOR
ARTHUR H. DRELICH

BY
Alexander T. Karilas.
ATTORNEY

SHAPED ARTICLES HAVING IMPROVED SURFACE PROPERTIES AND CORONA DISCHARGE METHODS AND APPARATUS FOR MAKING THE SAME

The present invention relates to films, sheets, expanded or foamed products, fibrous webs, and similar synthetic, organic, polymeric shaped articles and structures having improved surface properties and characteristics; and to methods and apparatus for making the same. More specifically, the present invention relates to such shaped articles and structures which have been treated by exposure to the action of an electrical corona discharge in an atmosphere of a reactive gas which does not have an affinity for electrons and which is capable of acting as a chemical reducing agent, such as carbon monoxide, for example.

Synthetic, organic, polymeric shaped articles either in fibrous form such as fibrous webs, nonwoven fabrics, etc., or in non-fibrous form such as films, sheets, tapes, strips, etc., are very well known in commerce and industry and have been used widely in many areas which run the gamut from packaging materials to textile garments and protective materials.

As such, these polymeric materials are exposed during usage to a wide variety of conditions, requirements, and circumstances wherein they have need for particular and specific physical properties and characteristics. Among such physical properties and characteristics may be listed surface bonding and adhesion capabilities, fluid absorbency rates, fluid wetting and wicking properties, etc.

These surface physical properties and characteristics are particularly important in those types of polymeric materials which are relatively inert and have good resistance to acids, alkalis, bleaches, solvents, and other chemicals but also, unfortunately, may possess low degrees of surface bonding and adherence capabilities, low fluid and moisture absorbency rates, poor fluid wetting and wicking properties, etc. Examples of such polymeric materials include the polyolefins, such as polypropylene, polyethylene, and propylene-ethylene copolymers; the polyesters such as "Mylar," "Dacron," "Kodel," "Fortrel," etc.; the polyamides such as nylon 6/6, nylon 6, nylon 10, nylon 6/10, etc.; the fluorocarbons such as "Teflon"; the vinyl polymers and co-polymers such as polyvinyl chloride, polyvinylidene chloride, the polyvinyl ethers, etc.; the polyethers; the polyurethanes; the cellulosics such as cellulose acetate, cellulose ethers, etc.

The invention is also of applicability to fibrous webs of such polymeric materials which are intended to be adhesively bonded into self-sustaining nonwoven fabrics and which therefore require a good bonding and adhering capability to the adhesive bonding agent being used.

It is a principal purpose of the present invention to treat such polymeric materials so as to improve and enhance such properties and characteristics of surface bonding and adherence capabilities, fluid absorbency rates, etc., without affecting other desirable properties and characteristics.

It has been discovered that such purpose may be realized by exposing such polymeric materials to the action of an electrical corona discharge in an atmosphere of a reactive gas which does not have an affinity for electrons and which is capable of acting as a chemical reducing agent, such as carbon monoxide, for example. Such discharge is brought about as a result of the ionization of gas surrounding a conductor and is called a corona discharge. It occurs when the potential gradient exceeds a certain minimum value.

Such purpose, and other purposes and objects of the present invention, as well as features and advantages thereof, will be disclosed in greater detail by reference to the following specification and claims and accompanying drawings wherein there are disclosed preferred embodiments of the inventive concept.

Figure 1:
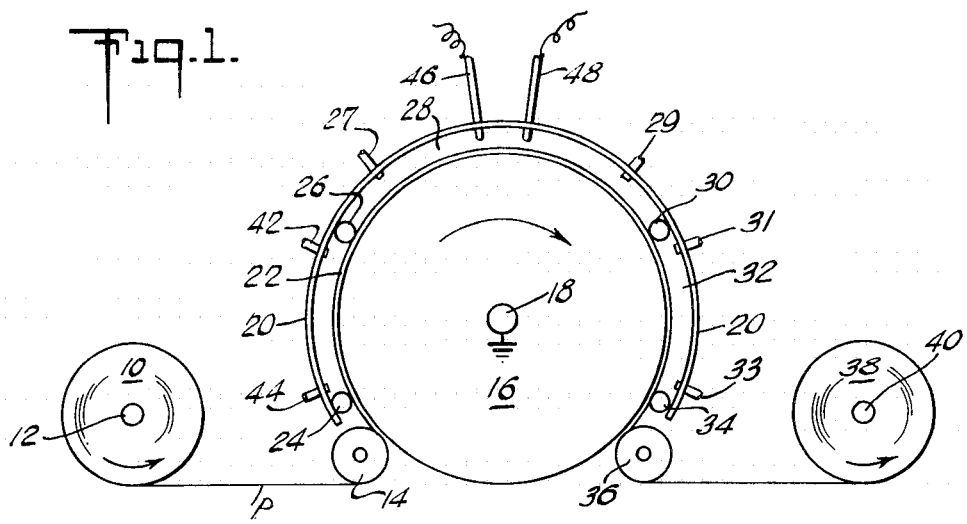
FIG. 1 is a diagrammatic elevational drawing, illustrating preferred apparatus for carrying out the preferred processes of the present invention.
Figure 2:
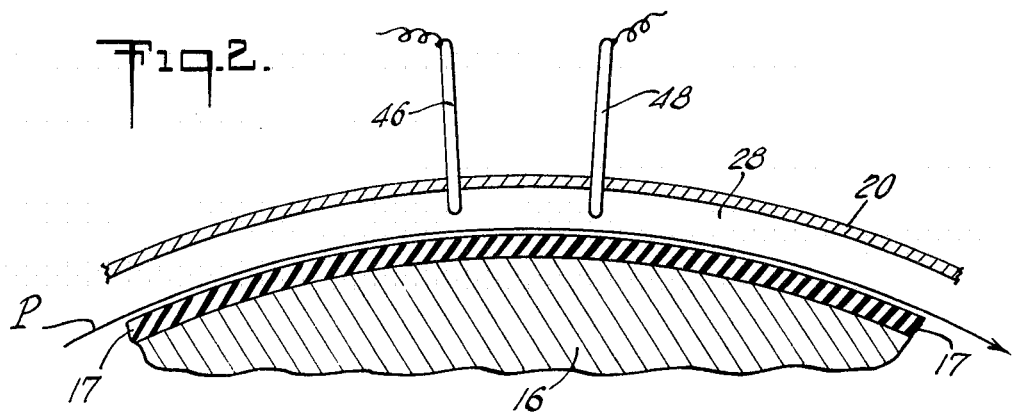
FIG. 2 is a fragmentary cross-sectional enlarged elevational view showing in greater detail the relationship of the electrodes and the polymeric material being treated.

In the specific embodiment of the invention shown in the drawings and with particular reference to FIG. 1 thereof, there is shown a polymeric shaped article P, such as a plastic sheet or fibrous web which is being delivered from a suitable source of supply such as a supply roll 10 which is rotatable on a shaft 12. The sheet P is delivered to a small rotatable guide roll 14 located immediately adjacent a large roll or drum 16 rotatable on a shaft 18. The sheet P may be placed directly on the cylindrical surface of the drum 16 by the guide roll 14 and is carried thereon. For reasons which will become clear hereinafter, the cylindrical surface of the drum 16 is made of an electrically non-conducting material 17, such as DuPont "Hypalan," or the like, whereas the main body of the drum 16 and its shaft 18 are electrically conducting and are connected electrically to a ground whereby the drum 16 becomes a ground or negative electrode.

Surrounding the drum 16 for a portion of its periphery is a stationary annular housing 20 which is also made of an electrically non-conducting material. The housing is preferably made of an optically transparent material whereby any reaction taking place within its confines can be visually observed and adjusted, or terminated, if necessary. The annular housing 20 has short side walls which fit snugly against the peripheral surface of the drum 16 and thus forms therewith a somewhat generally rectangular tunnel-like chamber 22 into which the plastic sheet P is advanced. A relatively air-tight seal, such as provided by a rotatable roll 24, or a pair of such rolls, is used to close off or seal the entrance to the chamber 22. As noted, another roll 26 (or a pair of rolls) is used to close off and seal the exit from the chamber 22. Another chamber 28 is thus begun and this, in turn, is closed off and sealed by another roll 30 or pair of rolls. A third and final chamber 32 is thus also begun and is sealed off by still another roll 34, or pair of rolls.

The rolls 24, 26, 30 and 35 are formed of a relatively soft, resilient material, such as rubber, silicone derivatives, or other materials coated with rubber, "Teflon" fluorocarbons, etc., and they are so fitted into the housing 20 and so pressed against the polymeric sheet material P on the drum 16 that substantially an air-tight seal thereat is obtained. For reasons which will become clear hereinafter, the rolls 26 and 30 which close off and seal the second of the three chambers are important and a good seal thereby is desirable. If desired, a plurality of such sealing rolls may be used to insure a good air-tight seal.

The sheet P thus is passed through three chambers successively, namely chambers 22, 28, and 32, and is then guided under a small rotatable exit guide roll 36 to be forwarded to and wound on rewind roll 38 rotating on shaft 40.

During its passage through these three chambers, the polymeric sheet material P is treated according to the principles of the present invention whereby its surface properties and characteristics are improved.

In chamber 22, which is the first chamber the polymeric material P enters, a pretreatment or cleaning of the polymeric material P takes place whereby it is "washed" free of its boundary layer of air or atmosphere environment by being passed in intimate contact with a relatively inert gas, such as helium, nitrogen, or carbon dioxide. Such gas is relatively non-reactive; is free of gaseous or atmospheric oxygen; and acts as a purging or scrubbing gas. It enters the chamber 22 through an upper inlet 42, passes down the length of the chamber 22, and leaves through a lower outlet 44. The purging action is thorough and the polymeric material P has the boundary layer of air or other atmospheric environmental matter substantially completely removed before it leaves the first chamber.

The polymeric material P then passes under the rotatable seal roll 26 and enters the second or electrical corona discharge reaction chamber 28. Positioned directly above the chamber 28 are one, two, or more positive electrodes, 46, 48 which are connected electrically to a suitable power source (not shown) which supplies an alternating (or pulsating direct) current at the required or desired voltage, amperage, and frequency as to generate an electrical corona discharge.

The electrodes 46 and 48 are long, thin, blade or knife-like members which extend parallel to the axis or shaft 18 of the drum 16. They extend for the full axial length of the drum 16.

The conditions are such that an electrical corona discharge is generated between the electrodes 46, 48 and the drum 16 which, as mentioned previously, is grounded through the shaft 18, as noted in FIG. 1. Such electrical corona discharge, of course, passes through the reaction chamber 28 and through the peripheral surface of the drum 16 and naturally passes through any materials within the chamber 28, and of particular interest to the present invention, through the polymeric material P on the peripheral surface of the drum 16.

The interior of the second (reaction) chamber 28 is supplied with carbon monoxide so that the electrical corona discharge treatment of the polymeric material P takes place in an atmosphere which contains substantially no gaseous or atmospheric oxygen and in which the reactive gas is essentially carbon monoxide, with or without an inert diluent carrier gas such as nitrogen, carbon dioxide, or other relatively non-reactive gas. Such inert diluent carrier gas may be present in varying amounts varying from a few percent by volume up to as much as about 90 percent or 95 percent by volume of the total gaseous mixture in the second (reaction) chamber depending upon the particular situation involved.

The carbon monoxide or the mixture of gases containing carbon monoxide is held at about atmospheric pressure but, if desired, such pressure may be decreased or increased to a value less or greater than atmospheric. The carbon monoxide may be admitted or removed from the chamber 28 by one or more inlets or outlets 27, 29.

Carbon monoxide is a colorless, tasteless, odorless gas at room temperature and possesses a marked adverse physiological effect on animals and humans through its combination with blood. It is not a so-called "Lewis acid" and is not considered an electron acceptor. As such, it does not have an affinity for electrons. It is considered a chemical reducing agent.

In carrying out the principles of the present invention, the potential difference between the positive electrodes 46 and 48 and the rotating drum 16 which forms a negative or ground electrode may vary from a voltage as low as about 3,000 volts up to as high as a pulsating peak voltage of about 100,000 volts, or higher. Normally, however, it is preferred to employ minimum voltages in the range of from about 3,000 volts to about 5,000 volts, although for some polymeric materials, voltages in the range of from about 10,000 to about 25,000 volts is frequently desirable. The current to the electrodes may range from about 0.2 root mean square ampere up to about 5.5 root mean square amperes. Within the more commercial aspects of the present invention, however, a range of from about 0.3 to about 3.5 root mean square amperes is preferred. Frequencies of from about 350 cycles per second up to 500,000 cycles per second, or higher, are used. However, within the more commercial aspects of the present invention, frequencies of from about 300,000 to about 500,000 cycles per second are used.

Power to the electrodes may range from as low as about 2½ watts per linear inch of positive electrode length to as high as about 100 watts per linear inch of positive electrode length.

As shown in FIG. 1, the positive electrodes 46 and 48 pass through the outer surface of the housing 20 and have their blade or knife-like ends very closely spaced with respect to the cylindrical surface 17 of the drum 16 carrying the polymer sheet material P. This gap is adjustable and may be varied within relatively wide limits and is in the range of from about 0.015 inch as less, if possible, up to about ¼ inch. More commonly, however, gaps of from about 0.030 inch to about ⅛ inch are used. It is to be appreciated, however, that these gaps or distances are measured from the end of the positive electrodes 46 and 48 to the non-conducting surface 17 of the drum 16. The distance from the positive electrodes 46 and 48 to the electrically conducting surface of the drum 16 is therefore greater than the previously mentioned distances by the thickness of the non-conducting layer 17, which may be in the range of from about 0.020 to about ¼ inch. The positive electrode to negative electrode distance is therefore in the range of from about 0.035 inch to about ½ inch.

The time of exposure of the polymeric material P to the electrical discharge may also be varied within relatively wide limits depending upon the particular circumstances involved and may be as short as about 0.0001 second, if a short treatment is desired. Longer exposures up to 0.01 second are more normally used and exposures up to 1 second are useful for specific heavier treatments on heavier polymeric materials.

The speed of the polymeric material P through the corona discharge chamber may also be varied within relatively wide limits depending upon the requirements and needs of the particular circumstances. On the average, however, speeds of from about 2 yards or less per minute to about 70 yards or more per minute are normally employed.

If it is desired to increase the effective reaction time between the polymeric materials and the reactive gas in the corona discharge chamber, such may be accomplished, without decreasing the linear speed of the polymeric materials, for example, by utilizing a reactive gas pre-treatment in the first chamber whereby the surface of the polymeric materials are prepared for the reaction in the corona discharge chamber. For example, inclusion of carbon monoxide, either partially or entirely, in the first chamber will not only remove the boundary layer of air or other atmospheric environmental matter from the polymeric materials but also prepares the surface of the polymeric materials for reaction with the electrical corona discharge.

Having passed through the first two chambers 22 and 28, the polymeric material P then enters the third chamber 32, which may be considered a secondary reaction chamber, somewhat generally like the second chamber 28, in that the reaction which normally started in the second chamber is allowed to continue in the absence of gaseous or atmospheric oxygen. If it is desired to continue the reaction, the third chamber is filled with a reactive type gas, such as carbon monoxide, by means of inlets and outlets 31 and 33.

If desired, a suitable non-reactive diluent carrier gas, i.e., a gas which does not interfere with the action of the carbon monoxide, may be used to dilute and to facilitate the flow of the carbon monoxide in either or both the second (reaction) chamber 28 or the third (secondary reaction) chamber. Such non-reactive carrier gases would include nitrogen, carbon dioxide, or other relatively inert gases.

After passing through the last chamber 32, the treated polymeric material P is forwarded to and wound on re-wind roll 38 rotatable on shaft 40.

The polymeric material P may be selected from a large group of synthetic, organic, polymeric shaped structures or articles of which the previously mentioned materials are representative. They may be treated in any shape, size or form, although sheet-like materials, as used herein to describe the invention, are the most common. Such materials are normally treated at room temperature. However, if desired, such polymeric materials may be pre-heated to any desired elevated temperature up to 150° F. or higher, prior to contacting the carrier drum. Or, if it is found more convenient to do so, the carrier drum may be heated to the desired elevated temperature.

The weight and thickness of the polymeric materials may also vary widely. Films as thin as ½ mil and as thick as 10 mils are of greatest applicability, although sheets having thicknesses greater than 10 mils are also applicable. Fibrous webs as light as about 150 grains per square yard are applicable and fibrous webs up to about 1,000 grains or more per square yard are also of use.

When a film, sheet or similar material is treated in accordance with the principles of the present invention, it is not be noted that both surfaces or sides of the film or sheet are chemically modified and their surface physical properties and characteristics changed. The central or internal portions of the film or sheet, however, remain basically unmodified. When a fibrous web or similar open or porous material is treated by the principles of the present invention, the complete peripheral surfaces of the individual fibers thereof appear to be chemically modified and their surface physical properties and characteristics changed.

The exact reaction mechanism by which the surface modifications of the polymeric materials takes place is not completely or precisely understood at the present time. However, it is believed that, under the influence of the energy of the electrical corona discharge and the effect of the free radical liberation thereat, the reactive gas, carbon monoxide, chemically reacts with the polymeric material at the surfaces thereof to form a relatively shallow layer of a different chemical species which possesses different surface properties and characteristics than those possessed previously by the polymeric material, itself. Such relatively shallow layer may be on the order of only a few hundred molecules thick but it is apparently sufficient to affect the surface properties and characteristics of the polymeric material. Most likely, the outermost molecules are reacted the most, with molecules located farther from the surface being reacted less frequently, with evidence indicating that no substantial reaction takes place a few thousand molecules distance from the surfaces of the polymeric material.

By thus altering surface molecules only, such surface properties as adhesion, bonding, wetting, wicking, fluid absorbency, etc., can be significantly altered without significantly changing the bulk polymer properties and characteristics.

Figure 3A:
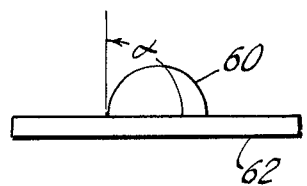
FIG. 3A is a diagrammatic drawing showing a contact angle measurement on a drop deposited on an untreated film.
Figure 3B:
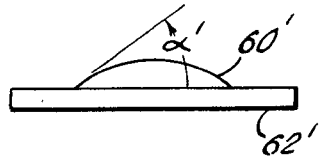
FIG. 3B is a diagrammatic drawing showing a contact angle measurement on a drop deposited on a film treated in accordance with the principles of the present invention.

The fact that there has been a change in the properties and characteristics of the surfaces of the polymeric materials treated in accordance with the principles of the present invention is determined by means of contact angle determinations. As used herein, the contact angle is the angle formed by a drop of liquid on the surface of a solid at the gas-solid-liquid interface, as measured by the dihedral angle of the liquid. As shown in FIG. 3A, a drop of liquid 60 is deposited on the surface of an untreated film 62 and does not readily wet the surface thereof, assuming an angle $\alpha$ of approximately 90°. In FIG. 3B, a drop of the same liquid 60' is deposited on the surface of the same film 62' after it has been treated in accordance with the principles of the present invention. As noted, the drop more readily wets the surface of the treated film 62' and assumes an angle $\alpha$' of approximately 36° to the surface of the film. The degree of change is thus established. The liquid used is customarily de-ionized, distilled water for purposes of relative comparison.

The invention will be further described by reference to the following Examples wherein there are disclosed preferred embodiments of the present invention. However, it is to be appreciated that such Examples are illustrative and not limitative of the broader aspects of the inventive concept.

In these Examples, references to percentages or proportions of gases are given by volume. Also, in these Examples, reference will be made to a "Peel adhesion Test." This is a test for the surface adhesive power of a plastic film or similar sheet-like material. The subject film is placed flat on a surface, such as a glass plate. A clean, bleached cotton fabric (80 × 80 square construction) is dipped into an aqueous polyvinyl acetate latex dispersion, the excess dispersion is removed, and the fabric placed onto the flat film. The composite structure is rolled with a press roller to remove all surplus polymer latex. The composite structure is dried in air and then heat-cured at about 230° F. in a curing oven for about 3 minutes.

The cured composite structure is then removed from the curing oven and allowed to cool in air. It is then removed from the plate glass and is cut into strips 1 inch wide and 4 inches long. The composite structure is peeled apart by hand approximately only 1 inch and the peeled ends are placed in the clamping jaws of an Instron tensile tester. The jaws move away from each other at a constant rate of 12 inches per minute, and the force required to delaminate this composite structure is recorded on a chart, according to the customary practice with an Instron tester. The configuration of the composite structure during the peel test somewhat generally resembles the letter "T," and this test is commonly also called the "T Peel Test."

It is to be appreciated that the term "bonding and adhesion" is used in its broad sense and covers bonding and adhesion to other materials in all forms including other polymeric materials, adhesives, bonding agents, printing inks, dyestuffs, pigments, etc.

EXAMPLE 1

This apparatus illustrated in FIG. 1 is employed to expose a 2-mil film of polypropylene to an electrical corona discharge in the presence of a reactive gas. The operating conditions are as follows:

The high voltage generator is a Model HFSG-2 High Frequency Spark Generator 1.5 KV (Lepel High Frequency Laboratories, Inc.) which employs a Tesla transformer to generate the high voltage which is applied to the electrodes. The secondary coil of the Tesla transformer is connected to the electrodes. Line power is 60 Hz (cycles per second).

Current (amperage) bursts are observed approximately every 200–400 micro-seconds. A similar time-burst pattern of approximately every 200–400 micro-seconds also exists for electrode voltages which peak at about 100 KV for a duration of about 2 micro-seconds, with total duration of sparking of about 15 micro-seconds per burst, by the end of which time the voltage has fallen off to about 3–5 KV and sparking has subsided.

The thickness of the DuPont "Hypalon" 760-T electrically non-conducting insulation on the drum is about 3/16 inch. The gap from the electrode to the insulation is about 1/16 inch. The electrode-to-electrode spacing is therefore about ¼ inch.

The purging or cleaning gas in the first chamber is 100 percent nitrogen at slightly greater than atmospheric pressure and it has a flow rate of about 1,000 milliliters per minute. The electrical corona discharge takes place in the second chamber which contains 10 percent by volume carbon monoxide and 90 percent by volume of nitrogen as a diluent gas. The gases are maintained in the second chamber at slightly greater than atmospheric pressure. The flow rate is 1,000 milliliters per minute. The third chamber also contains 10 percent by volume carbon monoxide and 90 percent by volume of nitrogen as the diluent gas. The pressure in the third chamber is also slightly greater than atmospheric pressure and the flow rate is 1,000 milliliters per minute. The reaction which starts in the second chamber in the presence of the electrical corona discharge continues in the third chamber but gradually ends therein. The gases in all three chambers are slightly greater than atmospheric to insure a constant outward flow and to avoid contamination from atmospheric oxygen, humidity, or other contaminants.

The polypropylene film passes through the three chambers at a constant rate of about 100 inches per minute. The ambient temperature is about 72° F. (22° C.)

The contact angle of a liquid drop on the original untreated polypropylene film is greater than 90° and is in the range of from about 90° to 106° for 20 samples. The contact angle of a liquid drop on the treated polypropylene is reduced to a range from about 48° to about 68°, with an average of 62° for 20 samples.

The peel adhesion tests reveal a marked improvement in peel adhesion strength of from a value of normally below 0.05 pounds per inch width for untreated film to a value as high as about 5 pounds per inch width for the treated film, with failure when it occurs, being noted in the adhesive layer. This represents an improvement in peel adhesion strength of 100-fold or greater for some samples. Total samples investigated are 100 in number.

EXAMPLES II–VIII

The procedures of Example I are followed substantially as set forth therein except that the gases are changed, with the same gas in all three chambers, as follows:

| | |
|---|---|
| II. | 100% Carbon Monoxide |
| III. | 5% Carbon Monoxide, 95% Nitrogen |
| IV. | 25% Carbon Monoxide, 75% Carbon Dioxide |
| V. | 10% Carbon Monoxide, 90% Helium |
| VI. | 100% Atmospheric Air |
| VII. | 100% Nitrogen |
| VIII. | 100% Helium |

The results obtained in Examples II–V are comparable to those obtained in Example I, with peel adhesion test results as high as 5 pounds per inch width for the treated polypropylene films (approximately 100-fold improvement).

The results obtained in Examples VI–VIII are not as good, with peel adhesion test results averaging only about 1 to 1½ pounds per inch width, about ¾ pounds per inch width, and about ¼ pound per inch width, respectively. Such less desirable results are, of course, due to the failure to include the reactive gas (carbon monoxide).

EXAMPLES IX–XVI

The procedures of Example I are followed substantially as set forth therein except that a different polymeric material is used, as follows:

| | |
|---|---|
| IX. | ½-mil Polypropylene |
| X. | 1-mil Polypropylene |
| XI. | 5-mil Polypropylene |
| XII. | 10-mil Polypropylene |
| XIII. | 17-mil Polypropylene |
| XIV. | 2-mil Polyamide Nylon 66 |
| XV. | 2-mil Polyethylene Terephthalate Polyester |
| XVI. | Polypropylene Fibrous Web–550 Grains Per Square Yard |

The results obtained for examples IX–XIII (polypropylene) are comparable to those obtained for Example I, with peel adhesion tests results rising from less than about 0.05 pound per inch width for the untreated films to about 5 pounds or more per inch width for the treated films (approximately 100-fold increase).

In Example XIV, (polyamide nylon 66) the peel adhesion increases from about 1–2 pounds per inch width for untreated films to about 5–6 pounds per inch width for treated films (250 percent to 600 percent improvement).

In Example VX, (polyethylene terephthalate polyester) the peel adhesion also increases from about 1–2 pounds per inch width for untreated film to about 5–6 pounds per inch width for treated films (250 percent to 600 percent improvement).

In Example XVI, the treated polypropylene fibrous web is bonded with self-cross-linking polyvinyl acetate and is compared to untreated polypropylene fibrous webs of the same type and weight and bonded in the same way but untreated in the corona discharge chamber. Tensile strengths are compared. Improvement is noted in the dry tensile strength of the corona discharge treated sample. Wet tensile strengths are also improved, particularly in the cross direction, wherein 20 percent – 50 percent increases are observed for the corona discharge treated samples, along with comparable increases in modulus values determinations. The treated polypropylene fibrous web also shows at least a 50 percent increase in fluid absorbency rate (by capillary rise).

EXAMPLE XVII

The apparatus illustrated in FIG. 1 is used, basically as described in Example I, except that a Vetaphone Electronic Treating Machine, Model T-1,000, (Denmark) is used to supply the high frequency spark. This is a 1 KW unit for operation on 220 V., single phase, 60-cycle supply. The electrode voltage peaks at about 50 KV in a fairly regular sine curve wave every 30 micro-seconds. The current (amperage) bursts occur regularly every 15 micro-seconds, i.e., whenever the electrode voltage reaches maximum or minimum peaks. The results (peel adhesion tests, etc.) are comparable to those obtained in the preceding Examples.

Although the preceding Examples have disclosed specific materials which are treated under specific conditions, such is not to be construed as limitative of the inventive concept, except as defined by the scope of the appended claims.

What is claimed:

1. A process for improving the surface properties and characteristics of synthetic, organic, polymeric shaped articles which comprises subjecting the surface of a synthetic, organic, polymeric shaped article to the action of an electrical corona discharge in an atmosphere containing at least about 5 percent carbon monoxide.

2. A process as defined in claim 1 wherein the synthetic, organic, polymeric shaped article is subjected to a pretreatment in a relatively inert, non-reactive gaseous atmosphere, whereby the boundary layer of air and atmospheric environmental materials is removed therefrom.

3. A process as defined in claim 1 wherein the synthetic organic, polymeric shaped article is subjected to a post-treatment in an atmosphere containing carbon monoxide whereby the reaction which started in the atmosphere of carbon monoxide and in the presence of an electrical corona discharge continues in the absence of an electrical corona discharge.

4. A process as defined in claim 1 wherein the synthetic, organic, polymeric shaped article is subjected to a pre-treatment in an atmosphere containing carbon monoxide whereby the surface of the shaped article is prepared for the reaction which starts in the atmosphere containing a reactive gas in the presence of the electrical corona discharge.

5. The product of the process defined in claim 1 wherein the surfaces of the synthetic, organic, polymeric shaped article form a reaction product with carbon monoxide.

6. A product of the process as defined in claim 4.

* * * * *